Dec. 19, 1944.                Q. H. CARLTON                2,365,247
              LOCKING DEVICE FOR REMOTE CONTROL AND
                 OTHER FORCE-TRANSMITTING SYSTEMS
                    Filed Jan. 11, 1941         2 Sheets-Sheet 2
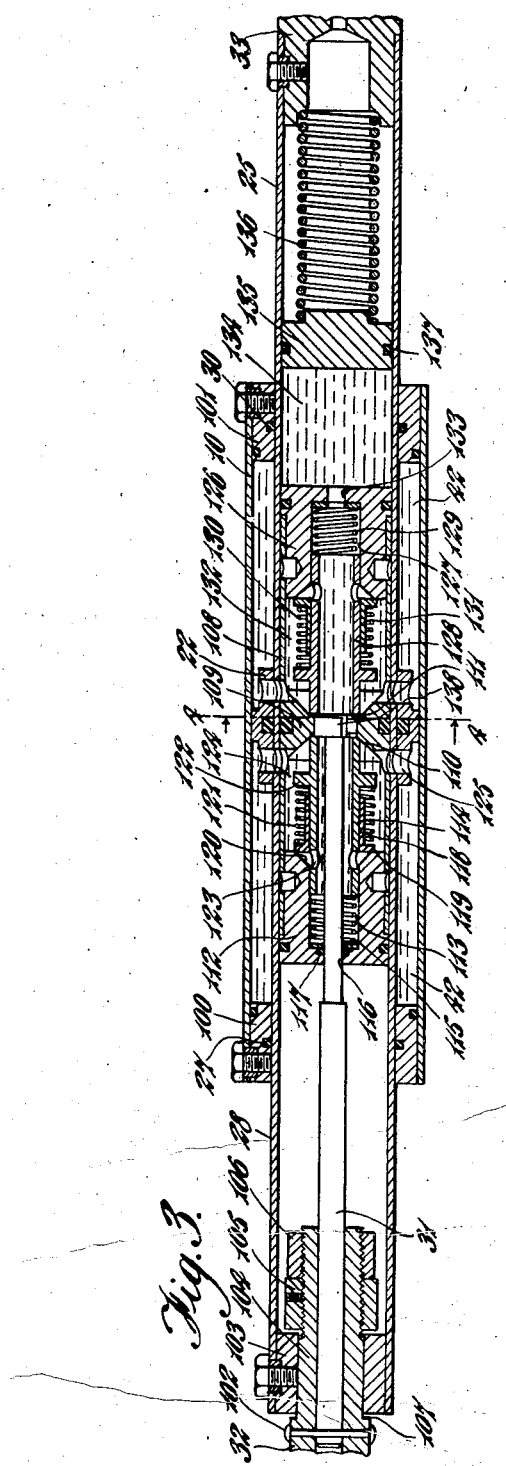
Inventor
Quintin H. Carlton
By Martin J. Finnegan
Attorney Patented Dec. 19, 1944

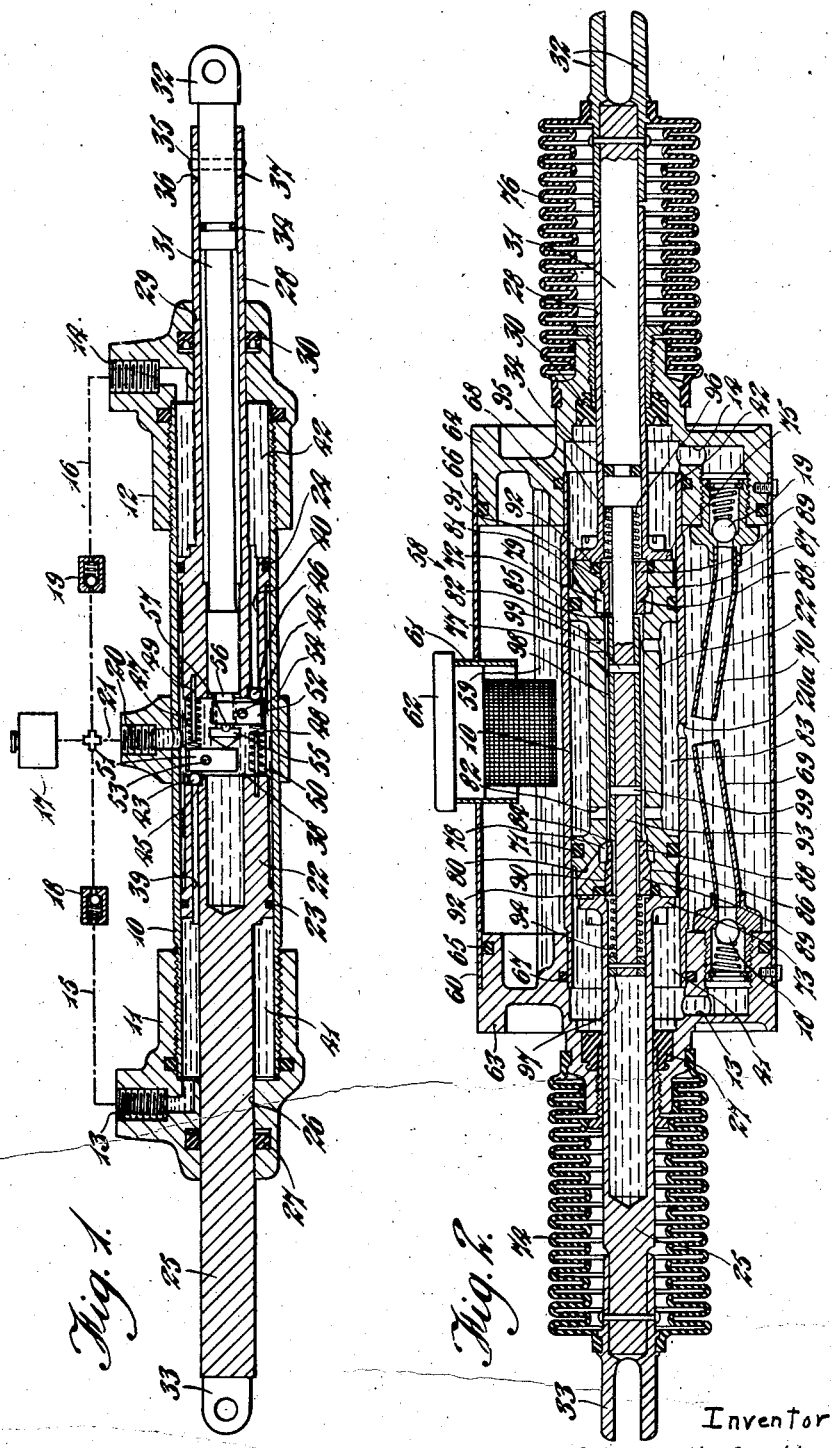

2,365,247

UNITED STATES PATENT OFFICE 2,365,247

LOCKING DEVICE FOR REMOTE CONTROL AND OTHER FORCE-TRANSMITTING SYSTEMS

Quintin Healey Carlton, London, England, assignor to Automotive Products Company Limited, London, England Application January 11, 1941, Serial No. 374,137
In Great Britain January 18, 1940

12 Claims. (Cl. 192—8)

This invention relates to locking devices for remote control and other force transmitting systems.

In remote control systems and other systems of a similar nature, it is often desirable to prevent the actuated member from moving under the influence of externally applied forces, with the exception, of course, of those forces which are received from the actuating member of the system. For example, in a remote control system for operating the ailerons of an aircraft it is important that the ailerons should be supported sufficiently rigidly to prevent their setting from being changed by external forces, such as those produced by drag or lift during the flight of the aircraft; despite this, however, the ailerons should be capable of being adjusted freely from one position to another through the medium of the appropriate controlling mechanism, usually, the pilot's control column. Locking devices which have been used hitherto, however, are apt to be unsteady in operation, more especially when the actuated member is subjected to an externally applied force, and it is the primary object of the present invention to provide an improved form of locking device which may be arranged to be completely progressive in operation. It is a further object of the invention to provide an improved construction of locking device which is intended more particularly for incorporation in a mechanical controlling system for the ailerons of an aircraft, but which is also suitable for various other force transmitting systems where it is desired that the actuated member shall be solely under the control of the actuating member.

In a hydraulic locking device of the known form comprising a fixed cylinder having its interior divided into two compartments by a piston, which is connected by an actuated member with the member requiring to be operated and is fitted with a pair of opposed by-pass valve members adapted to move axially into and out of engagement with corresponding annular seatings, these valve members being normally closed so as to prevent liquid flowing from one compartment to the other, and thus prevent or retard movement of the piston in response to force applied through the said member, said locking device also including an actuating member which is connected operatively with a handle or other controlling device and is coupled with the piston by a lost motion device, and which is arranged, when moved, to open one or other of the by-pass valves so as to allow liquid to pass from one compartment of the cylinder to the other, the present invention is characterised by the fact that, of each by-pass valve member, that surface which is acted upon by pressure liquid has an effective area such that the force exerted by said pressure liquid upon the valve member in the valve-opening direction is equal to or greater than the force of the same pressure liquid tending to hold the valve closed.

According to a feature of the invention, a locking device of the above form is characterised by the fact that each of the by-pass valve members is normally closed by a spring, but is arranged so that the force exerted on the valve member by said spring tends to be counteracted by the force exerted on said valve member by the pressure liquid which said valve serves to by-pass, thus enabling said valve to open automatically when a force exceeding a predetermined value is applied to the device by the member normally requiring operation.

Further, in a hydraulic locking device of the above-mentioned known form, the present invention is characterised by the fact that each of the by-pass valve members is substantially cylindrical in shape, with one end normally in engagement with an annular seating on the piston, while the other end slides within a bore in said piston, the arrangement being such that the diameter of the said bore is substantially equal to the outside diameter of that area of the valve member engaging the annular seating, and the outside of the valve member between the seating and the said bore is subject to the pressure of the liquid which is by-passed by said valve, so that the valve member, when closed, is in a balanced state as far as the said pressure liquid is concerned.

In one arrangement movement of the actuating member permitted by the lost motion device relieves the spring pressure upon the appropriate by-pass valve and enables it to be opened more easily by the pressure of the liquid in that cylinder compartment which tends to become smaller on account of the said movement of the actuating member, a rocker, pivoted intermediate its length to the piston conveniently having one end interposed between the by-pass valve member and its spring, the other end of the rocker being moved by the actuating member. If desired the piston may be formed intermediate its length with a cavity from which longitudinal passages extend in opposite directions to the two cylinder compartments, respectively, the rockers, valve springs and the by-pass valves being disposed within said cavity, with said valves arranged to close the entrances to the longitudinal passages.

Further, the piston may have a piston rod extending through both ends of the fixed cylinder, one end of the piston rod being tubular in form to accommodate slidably the actuating member. The by-pass valve members may be tubular and may be arranged within the piston so that their mutually facing ends engage with corresponding seatings at opposite ends of a passage extending through the piston, the outer ends of the by-pass valve members being slidable within bores in the piston, and said valve members being arranged to be urged off their seatings by a valve-opening member which is disposed within the passage between the seatings and is connected operatively with the actuating member. In this arrangement the valve-opening member may extend through coiled compression springs which urge the valve members to their closed positions and which, at their outer ends engage with shoulders on said valve-opening member. The fixed cylinder may be incorporated within a reservoir for spare liquid, while in an alternative arrangement a reservoir is provided within a tubular piston rod which carries the piston and which is slidably mounted within the end wall of the cylinder to serve as the actuated member, said tubular piston rod conveniently being fitted with a floating piston which is resiliently urged along said piston rod to maintain the whole liquid content of the locking device under pressure.

The invention is illustrated by way of example in the accompanying drawings, in which:

Figure 1 is a diagrammatic sectional elevation showing one form of locking device;

Figure 2 is a sectional elevation of a modified construction having the fixed cylinder incorporated in a reservoir for spare liquid;

Figure 3 is a sectional elevation of another construction in which the reservoir is contained within the piston rod constituting the actuated member; and Figure 4 is a sectional elevation taken on the line 4—4 of Figure 3.

The hydraulic locking device shown in Figure 1 comprises a cylinder 10 which, when the device is installed, is fixedly mounted upon the aircraft or other appropriate support, and said cylinder in operation has to act in the capacity of an anchorage for preventing unwanted movement of the aileron or other movable member in connection with which the device is provided. The fixed cylinder 10 has its ends closed by caps 11 and 12 respectively, and these are provided with connections 13 and 14 for pipes 15 and 16 leading from a reservoir 17 for spare working liquid, non-return valves 18 and 19 being provided in said pipes 15 and 16 respectively. A third connection 20 disposed halfway along the fixed cylinder 10 communicates directly with the reservoir 17 by way of a pipe 21 as shown.

A piston member 22 having packing rings 23 and 24 is slidably mounted within the fixed cylinder 10 and is formed with a piston rod, one end of which serves as the actuated member and is indicated at 25, said end being arranged to slide freely through a bore 26 in the end cap 11, an annular packing cup 27 being provided to prevent leakage of liquid. The opposite end of the piston rod is indicated at 28 and is slidable in a similar manner through a bore 29 which is formed in the end cap 12 and is provided with a packing cup 30. The piston rod 28 is, however, tubular in form and contains a rod or plunger 31 serving as the actuating member of the device. Thus the rod or plunger 31 has an eye fitting 32 adapted to be connected by suitable mechanism with an operating device such as a hand lever (not shown), while the part 25 of the piston rod has a fitting 33 arranged to be connected with the aileron (not shown) or other device requiring operation.

The rod or plunger 31 is grooved to receive a packing ring 34 in order to prevent leakage of liquid, and it is also fitted with a diametral pin 35, the projecting ends of which extend into a pair of slots 36 and 37 formed in the tubular part 28 of the piston rod, thus providing a lost motion connection between the rod or plunger 31 (constituting the actuating member) and the piston rod 25, 28 (forming part of the actuated member).

The piston member 22 is formed with a diametral slot or cavity 38, from which a pair of longitudinal passages 39 and 40 extend and lead into cylinder compartments 41 and 42 respectively in the ends of the fixed cylinder 10. Valve balls 43 and 44 are arranged to close the ends of the passages 39 and 40 nearest the cavity 38 and they are held normally in firm engagement with their annular seatings 45 and 46 by means of relatively strong coiled compression springs 47 and 48 respectively, the springs being prevented from buckling by the provision of pins 49 and 50 fastened to the piston 22. The springs 47 and 48 do not bear directly upon the balls 43 and 44, however, as rockers 51 and 52 are pivotally mounted within the cavity 38 upon pins 53 and 54 respectively disposed in each case substantially halfway along the rocker, as shown. That end of each rocker 51 or 52 nearest the wall of the fixed cylinder 10 receives the force from the corresponding spring 47 or 48 and itself presses the valve ball 43 or 44 into firm engagement with its seating 45 or 46. The opposite end of the rocker 51 is adapted to be engaged by a ridge-shaped head 55 formed upon a stem 56 of reduced diameter at the end of the rod or plunger 31. To accommodate this stem 56 the upper part of the rocker 52 is bifurcated and the two limbs are adapted to be engaged in a pivotal manner by a pin 57 passing through the stem 56 and partly embedded in the head 55.

The springs 47 and 48 acting upon the rockers 51 and 52 normally hold the rod or plunger 31 so that the pin 35 is disposed substantially halfway along the slots 36 and 37, said springs at the same time, of course, maintaining the valves 43 and 44 in their closed positions. In these circumstances any force applied to the piston rod 25 in either direction is resisted to a considerable extent owing to the fact that the liquid is trapped within the cylinder compartments 41 and 42, the strength of the springs 47 and 48 being sufficiently great to overcome any liquid force that is likely to act upon the balls 43 and 44 as a result of the normal loading of the aileron or the equivalent to which the locking device is connected. On the other hand, when the aileron or equivalent is to be readjusted, movement of the rod or plunger 31, say towards the left, first causes the head 55 to bear upon the rocker 51 so that the pivot 53 of the latter takes the reaction of the spring 47 and, to a large extent at least, removes the closing force from the valve ball 43. When the pin 35 reaches the left-hand end of the slot 36 the force applied to the rod or plunger 31 is transferred directly to the piston rod 28 and to the piston 22, which latter moves along the fixed cylinder 10. The liquid which is rejected from the compartment 41 owing to the reduction in the volume of the latter is unable to escape by way of the pipe 15 because of the non-return valve 18, and it therefore flows around the valve ball 43 and escapes by way of the connection 20 to the reservoir 17. At the same time, of course, the compartment 42 is increasing in volume and the requisite quantity of liquid is withdrawn from the reservoir 17 and passes into the compartment 42 by way of the non-return valve 19 and the pipe 16. When the movement of the rod or plunger 31 ceases, the spring 47 once again holds the valve ball 43 firmly against its annular seating 45, thus restoring the locking device to its operative condition. In a similar manner, when tension is applied to the rod or plunger 31 the pin 57 forming part of the head 55 acts upon the rocker 52 so as to enable the valve ball 44 to open, thus permitting liquid to escape from the compartment 42 as the piston 22 moves to the right.

It will be realised that with the construction shown in Figure 1 the locking device becomes ineffective if there is applied to the aileron or equivalent a load which is exceptionally heavy and which might possibly damage or overstrain the mechanism, the liquid pressure created in the compartment 41 or 42 under these circumstances being sufficiently great to shift the appropriate valve ball 43 or 44 against the full strength of the corresponding spring 47 or 48.

A modified construction of device is shown in Figure 2, in which the fixed cylinder is again indicated at 10, but in this instance it is disposed coaxially within a cylindrical reservoir 58 for a quantity of spare liquid 59. The reservoir 58 comprises an outer tube 60, which is formed with a filling neck 61 accommodating a readily removable but liquid-tight stopper 62. A pair of annular members 63 and 64 constitute the ends of the reservoir 58 and serve as mountings for the fixed cylinder 10, packing rings 65, 66, 67 and 68 being provided to prevent leakage of liquid. Halfway along its length the fixed cylinder 10 communicates with the reservoir 58 by way of a hole 20a, while connections 13 and 14 lead from the respective ends of the cylinder space, past non-return valves 18 and 19 respectively and through upwardly inclined pipes 69 and 70 into the interior of the reservoir at a position adjacent the opening 20a. By adopting this arrangement the locking device functions satisfactorily, even if inverted, provided of course that the reservoir 58 is reasonably full of liquid.

As in the previous example, a piston 22 is slidably mounted within the cylinder 10, the piston member 22 having two packing rings 71 and 72 which slide in a liquid-tight manner within the cylinder 10. A piston rod 25 secured to the piston 22 by a flange fitting 73, serves as the actuated member and passes slidably through a packing 27 provided within the end member 63, a rubber or like boot 74 being adapted to exclude grit and moisture from the sliding surface of the piston rod 25. At its opposite end the piston 22 carries a tubular piston rod 28, which is secured by a flange fitting 75 and passes slidably through a packing 30 in the end member 64. A rod or plunger 31 having a bifurcated end fitting 32 passes slidably through the piston rod 28 and is fitted with a packing ring 34 to prevent outward leakage of liquid through the tubular piston rod 28. The ingress of dirt and foreign matter is prevented by the provision of a rubber boot 76, which, at its outer end, is fastened around the fitting 32 so that its protects the two pairs of sliding surfaces corresponding with the exterior and the interior respectively of the tubular piston rod 28. The piston 22 is drilled to form an axial passage 77 having near its ends enlargements 78 and 79 connected by oblique passages 80 and 81 with the cylinder compartments 41 and 42 respectively. The passage 77 is in permanent communication with the reservoir by way of radial openings 82, which lead into an annular space 83 and thence to the opening 20a. The end parts of the passage 77 are arranged to form a pair of annular seatings 84 and 85, with which corresponding tubular valve members 86 and 87 are adapted to engage, each valve member being provided with a portion 88 of reduced diameter to engage with the corresponding seat and a slightly larger part 89 which slides in a liquid-tight manner within a corresponding bore 90 or 91 formed in the end of the piston 22. In each case a packing ring 92 is provided to prevent leakage of liquid along the bore 90 or 91. It will thus be seen that pressure liquid disposed within the enlargements 78 and 79 in each case tends to move the corresponding valve member 86 and 87 axially in a direction away from its seating 84 or 85. A stem 93 formed upon the end of the rod or plunger 31 extends axially through both of the valve members 86 and 87 and also through a pair of coiled compression springs 94 and 95 adapted to urge said valve members towards one another into engagement with their seatings 84 and 85 respectively, the spring 95 being arranged to engage a shoulder 96 upon the rod or plunger 31, while the spring 94 similarly co-operates with a collar 97 fitted to the extremity of the stem 93. A sleeve 98, which is just shorter than the normal separation of the valve members 86 and 87, is securely fastened to the stem 93 by diametral pins 99, and is adapted, when the rod or plunger 31 is moved in either direction, to press upon the corresponding valve member 86 or 87, and urge said member to its open position against the force of the corresponding spring 94 or 95. In each case opening movement of the valve member is limited by the engagement of said valve member with the corresponding piston rod 25 or 28, thus producing the effect of a lost motion coupling between the rod or plunger 31 and the piston rod 25. Thus when the rod or plunger 31 is moved to the left the sleeve 98 engages the valve member 86, thus shifting the latter axially out of engagement with its annular seating 84 and causing said valve member to engage with the adjacent end of the piston rod 25. Thereafter movement of the rod or plunger 31 is transferred to the piston rod 25 through the medium of the valve member 86 and the liquid rejected from the compartment 41 on account of the movement of the piston 22 passes through the oblique passage 80 and back to the reservoir by way of the radial openings 82 and the opening 20a in the cylinder 10. At the same time liquid is drawn into the compartment 42 through the pipe 70 and passes the non-return valve 19. The action is similar when the rod or plunger 31 is moved to the right, but in this case the valve member 87 is urged away from its seating 85 and acts in compression to transfer the force from said rod or plunger 31 to the flange 75, the piston 22, and thence to the piston rod 25. Any forces which act upon the aileron or equivalent tending to shift the position of the latter are, of course, imparted to the piston rod 25, and as they are transferred to the piston 22 pressure is created in the liquid within one or other of the compartments 41 and 42. The valve members 86 and 87 are of course both closed, and as the liquid cannot escape past the packing rings 71 and 72 of the piston, it follows that a locking effect is produced.

It will be realized, however, that with the construction shown in Figure 2 the locking device becomes ineffective if there is applied to the aileron or equivalent a load which is exceptionally heavy and which might possibly damage or overstrain the mechanism. The liquid pressure created by the piston 22 in the compartment 41 or 42 under these circumstances being such that there is exerted through the passages 80 or 81 and enlargements 78 or 79, respectively, liquid pressure sufficiently great to cause the shift of the appropriate valve 86 or 87 against the full strength of the corresponding spring 94 or 95 and thereby open such valve to the passage of the liquid medium so as to permit movement of the piston 22 in response to such exceptionally heavy load.

In the construction shown in Figures 3 and 4 a cylinder 10 is arranged to be secured fixedly to the aircraft or another appropriate support, and it contains an axially slidable piston member 22 attached to a tubular piston rod 28. The latter extends through a pair of annular end walls 100 and 101 of the cylinder 10, leakage of liquid being prevented by packing rings 27 and 30. The right-hand end of the piston rod 28 is indicated at 25 and serves as the actuated member of the locking device, an end fitting 33 being adapted to be connected with the aileron or equivalent device required to be operated. The actuating member comprises a rod 31, which is secured to an end fitting 32 by means of a pin 102, said end fitting having a plunger portion 104 which is axially slidable within a bush 103 in the tubular piston rod 28, and being adapted to be connected with the operating lever or equivalent (not shown). The plunger portion 104 is screw threaded for the reception of a pair of adjustable nuts 105 and 106, and these, in conjunction with a shoulder 107, serve to limit the permissible axial movement of the end fitting 32 relative to the tubular piston rod 28, thus serving in the capacity of a lost motion connection between the end fitting 32, which is an actuating member, and the part 25 of the tubular piston rod 28, i. e. the actuated member.

A sleeve 108 is fastened within the tubular piston rod 28 and it is formed halfway along its length with an inwardly projecting flange 109, which is somewhat triangular in cross section, as will be seen in Figure 3, so as to provide a pair of axially directed annular seatings 110 and 111. A plug member 112 is fitted in the left-hand end of the sleeve 108 and is formed with a bore 113 within which the outer end of a tubular valve member 114 is slidably mounted, said valve member 114 being urged axially by a coiled compression spring 115 so that its opposite end bears against the corresponding seating 110. The plug member 112 is bored at 116 so as to pass the rod 31, a packing washer 117 being provided to prevent leakage of liquid into the left-hand end of the tubular piston rod 28. A tubular non-return valve member 118 having a flange 119 adapted to close a frusto-conical recess 120 formed at the end of the bore 113 is slidably mounted upon the outside of the valve member 114 and is urged to its seated position, as shown, by means of a coiled compression spring 121 bearing at its opposite end against a flange 122 formed integrally with the valve member 114. This spring 121 also assists in holding the valve member 114 in engagement with its seating 110. Adjacent the recess 120 the valve member 114 is formed with openings 123, which lead from the interior of the valve member 114 past the non-return valve 118 to the space 124 within the left-hand end of the sleeve 108 and thence by way of radial passages 125 to the compartment 42 of the cylinder 10. The right-hand part of the sleeve 108 is similarly closed by a plug member 126 having a bore 127 within which a tubular valve member 128 is slidably mounted, the opposite end of said valve member 128 being adapted to engage with the seating 111 under the action of coiled compression springs 129 and 130. The latter, as before, acts to hold a non-return valve 131 normally in its closed position in engagement with the surface of the plug member 126. The outside diameter of the annular ring of contact between the seatings 110 and 111 and the valve members 114 and 128 respectively, is in each instance arranged to be substantially equal to the diameter of the corresponding bores 113 and 127, so that liquid pressure acting within the spaces indicated at 124 and 132 respectively have substantially no effect in urging the valve members 114 and 128 in either direction.

The plug member 126 is formed at its outer part with an opening 133 which leads to a reservoir space 134 disposed within the tubular piston rod 28, said space being bounded by a floating piston 135 which is urged to the left by means of a relatively strong coiled compression spring 136. The floating piston 135 is provided with packing 137 and thus acts to maintain the whole liquid content of the locking device at a pressure greater than atmospheric, thus minimising the risk of air being drawn into the liquid spaces of the device during operation.

The rod 31 is formed at its extremity with a head 138 which is triangular in shape so as to fit slidably within the flange 109 and at the same time provide free liquid communication between the interior of the valve member 114 and the interior of the valve member 128. The axial length of the head 138 is very slightly smaller than the separation of the valve members 114 and 128 when the latter are both seated, so that when the aileron or equivalent is not being adjusted the valve members 114, 118, 128 and 131 are all closed and effectively prevent the transfer of liquid from one of the cylinder compartments 41 and 42 to the other, except to the extent that said liquid can leak slowly between the outer surface of the piston 22 and the interior of the cylinder 10. When, however, the plunger 104 and rod 31 are moved, say towards the right in order to readjust the aileron or equivalent, the lost motion which is permitted between the plunger member 104 and the bush 103 enables the triangular head 138 to move the valve member 128 towards the right away from its seating 111. This permits liquid to escape from the compartment 42 and consequently the piston 22 with the tubular piston rod 28 and the actuated member 25 move bodily to the right, the liquid which passes the seating 111 finding its way through openings 123 and thence to the cylinder compartment 42 by opening the non-return valve 118. When the readjustment is completed the valve member 128 once again engages with its seating and the locking device is then effective to prevent rapid movement of the aileron or equivalent under the effect of loading applied to said aileron or equivalent. If desired, a substantially positive locking can be obtained by providing the piston 22 with external packing (not shown) for completely preventing leakage of liquid along the cylinder 10 when the valves 114 and 128 are closed.

It will be appreciated that the construction described is given merely as an example of the invention and that various modifications are possible. Thus, for instance, in some cases the piston might be fixed, the cylinder serving as the actuated element, while the improved device is applicable to various force transmitting and remote control systems, these being themselves either of a mechanical or a hydraulic nature. Where a liquid pressure remote control system is provided, for instance, to operate a retractable undercarriage, the reservoir of such system can be utilised for feeding the locking device according to the present invention.

What I claim is:

1. A hydraulic locking device (Fig. 2) comprising a fixed cylinder having its interior divided into two compartments by a piston 22 rigidly integrated with a piston rod 25 whose inner end is in the path of movement of an operating member 32; said piston also being integrated with a member 33 required to be operated, and further being integrated with a tubular piston rod 28 whose outer end terminates just short of, but in the path of movement of, the operating member 32; said piston further being fitted with a pair of opposed by-pass valve members adapted to move axially into and out of engagement with corresponding annular seatings, these valve members being normally closed so as to prevent liquid flowing from one compartment to the other, and thus prevent movement of the piston in response to force applied through the member to be operated, said operating member being arranged, when moved, to open one or the other of the by-pass valves so as to allow liquid to pass from one compartment of the cylinder to the other, characterised by the fact that each of the by-pass valve members is substantially cylindrical in shape, with one end normally in engagement with an annular seating on the piston, while the other end slides within a bore in said piston, the arrangement being such that the diameter of the said bore is substantially equal to the outside diameter of that area of the valve member engaging the annular seating, and the outside of the valve member between the seating and the said bore is subject to the pressure of the liquid which is by-passed by said valve, so that the valve member, when closed, is in a balanced state as far as the said pressure liquid is concerned.

2. A hydraulic locking device comprising a fixed cylinder having its interior divided into two compartments by a piston rigidly integrated with a piston rod whose inner end is in the path of movement of an operating member; said piston also being integrated with a member required to be operated, and further being integrated with a tubular piston rod whose outer end terminates just short of, but in the path of movement of, the operating member; said piston further being fitted with a pair of opposed tubular by-pass valve members for controlling the flow of liquid between said two compartments, said valve members being arranged within the piston so that their mutually facing ends engage with corresponding seatings at opposite ends of a passage extending though the piston, the outer ends of the by-pass valve members being slidable within bores in the piston, said valve members being arranged to be urged off their seatings by a valve-opening member which is disposed within the passage between the seatings and is connected operatively with the operating member and each of said valve members having an area upon which pressure liquid may act to unseat one of said valve members when the other of said valve members has been opened by said valve opening member.

3. A hydraulic locking device comprising a fixed cylinder having its interior divided into two compartments by a piston rigidly integrated with a piston rod whose inner end is in the path of movement of an operating member; said piston also being integrated with a member required to be operated, and further being integrated with a tubular piston rod whose outer end terminates just short of, but in the path of movement of, the operating member; said piston further being fitted with a pair of opposed tubular by-pass valve members for controlling the flow of liquid between said two compartments arranged within the piston so that their mutually facing ends engage with corresponding seatings at opposite ends of a passage extending through the piston, the outer ends of the by-pass valve members being slidable within bores in the piston, said valve members being arranged to be urged off their seatings by a valve-opening member which is disposed within the passage between the seatings and is connected operatively with the operating member, the valve-opening member extending through coiled compression springs which urge the valve members to their closed positions and which, at their outer ends engage with shoulders on said valve-opening member and each of said valve members having an area upon which pressure liquid from the compartment controlled by the opened valve member acts tending to unseat the other valve member.

4. A hydraulic locking device comprising a fixed cylinder having its interior divided into two compartments by a piston, passages in said piston connecting said two compartments to a common liquid space, valve members adapted to close said passages by engaging fixed seatings in said passages, resilient elements tending to seat said valve member, said valve members being so arranged in relation to said passages that said resilient elements constitute the sole biasing means tending to seat said valves, an actuating device having lost motion with respect to said piston and carrying a common actuating member adapted to cause opening of either of said valves when operated to tend to move the piston in a direction to reduce the volume of the compartment with which that valve is associated and hydraulically actuated means for opening the other of said valves upon such operated movement of said piston.

5. A hydraulic locking device comprising a fixed cylinder having its interior divided into two compartments by a piston, passages in said piston connecting said two compartments to a common liquid space, valve members adapted to close said passages by engaging fixed seatings in said passages, said valve members having each an unbalanced area upon which pressure liquid in the compartment, the connection of which to the common liquid space is controlled by that valve, acts to tend to unseat the valve, resilient elements tending to seat said valves, and an actuating device having lost motion with respect to said piston and carrying a common actuating member adapted to cause opening of either of said valves when operated to tend to move the piston in a direction to reduce the volume of the compartment with which that valve is associated.

6. A hydraulic locking device comprising a fixed cylinder having its interior divided into two compartments by a piston, passages in said piston connecting said two compartments to a common liquid space, valve members adapted to close said passages by engaging fixed seatings in said passages, said valve members being each balanced with respect to the pressure liquid in the compartment the connection of which to the common liquid space is controlled by that valve, resilient elements tending to seat said valves, and an actuating device having lost motion with respect to said piston and carrying a common actuating member adapted to cause opening of either of said valves when operated to tend to move the piston in a direction to reduce the volume of the compartment with which that valve is associated.

7. A hydraulic locking device comprising a fixed cylinder having its interior divided into two compartments by a piston, passages in said piston connecting said two compartments to a common liquid space, valve members adapted to close said passages by engaging fixed seatings in said passages, resilient elements constituting the sole means tending to seat said valves, means for transmitting the thrust of said resilient elements to said valves, and an actuating device having lost motion with respect to said piston and carrying a common actuating member adapted to move either of said force-transmitting means in such a manner as to relieve the corresponding valve of the pressure of the resilient element, whereby said valve is left free to open under the pressure of liquid in the compartment the connection of which to the common liquid space is controlled thereby.

8. A hydraulic locking device comprising a fixed cylinder having its interior divided into two compartments by a piston, passages in said piston connecting said two compartments to a common liquid space, seatings in said passages and formed each in one end of a valve chamber, a cylindrical recess coaxial with the seating in the end wall of each said chamber opposite to the seating, a tubular cylindrical valve member in each valve chamber adapted to slide in said recess, a connection from the valve chamber between the recessed end wall and the seating to one compartment of the fixed cylinder, resilient elements constituting the sole means tending to seat said valves, an actuating device having lost motion with respect to said piston and carrying a common actuating member adapted to cause opening of either of said valves when operated to tend to move the piston in a direction to reduce the volume of the compartment with which that valve is associated and hydraulically actuated means for opening the other of said valve members upon such operated movement of said piston.

9. A hydraulic locking device comprising a fixed cylinder having its interior divided into two compartments by a piston, a pair of opposed by-pass valve members in said cylinder, means for exerting hydraulic pressure to open said valves and thus permit movement of said piston, and means for directing the hydraulic pressure in such manner that said valves are at all times free of any hydraulic bias toward their closed positions.

10. A hydraulic locking device comprising a cylinder having its interior divided into two compartments by a piston, passages in said piston connecting said two compartments to a common liquid space, valve members adapted to close said passages by engaging seatings in said passages, said valve members having each an area upon which pressure liquid in the compartment, the connection of which to the common liquid space is controlled by that valve, acts to tend to unseat the valve, resilient elements tending to seat said valves, and an actuating device adapted to cause opening of either of said valves when operated to tend to move the piston in a direction to reduce the volume of the compartment with which that valve is associated.

11. A hydraulic locking device, comprising, in combination, a fixed cylinder, a piston dividing the interior of said cylinder into a first, second and third compartment, a member required to be operated rigidly integrated with said piston, first passages in said piston connecting said first and third compartments to the second compartment, first valve members adapted to control the first passages connecting the first and third compartments to the second compartment, first resilient elements tending to bias said first valve members to a closed position, second passages connecting said second compartment to said first and third compartments, second valve members adapted to control said second passages, second resilient elements tending to bias said second valve members to a closed position, said second valve members biased to an open position by a liquid under pressure in said second compartment, a push rod extending longitudinally into said cylinder and piston and in slidable relation therewith, means actuated by said push rod for selectively opening either of said first valve members for permitting movement of said piston, and means arranged upon the opening of said first valve member to operably connect said piston and push rod for movement of said piston in a direction to reduce the volume of the liquid in one of the compartments associated with said open first valve member.

12. A hydraulic locking device comprising a fixed cylinder incorporated within a reservoir for spare liquid, said fixed cylinder having its interior divided into two compartments by a piston rigidly integrated with a piston rod whose inner end is in the path of movement of an operating member; said piston also being integrated with a member required to be operated, and further being integrated with a tubular piston rod whose outer end terminates just short of, but in the path of movement of, the operating member; said piston further being fitted with a pair of opposed tubular by-pass valve members arranged within the piston so that their mutually facing ends engage with corresponding seatings at opposite ends of a passage extending through the piston, the outer ends of the by-pass valve members being slidable within bores in the piston and said valve members being arranged to be urged off their seatings by a valve-opening member which is disposed within the passage between the seatings and is connected operatively with the operating member.

QUINTIN HEALEY CARLTON.